United States Patent [19]

Lewis et al.

[11] Patent Number: 5,070,335
[45] Date of Patent: Dec. 3, 1991

[54] PULSE DOPPLER RADAR SYSTEMS FOR HELICOPTER RECOGNITION

[75] Inventors: Christopher Lewis; Robert J. Barton, both of Isle of Wight, England

[73] Assignee: Siemens Plessey Electronic Systems Limited, Ilford, England

[21] Appl. No.: 610,210

[22] Filed: Nov. 8, 1990

[30] Foreign Application Priority Data

Dec. 21, 1989 [GB] United Kingdom ............... 8928829
Apr. 23, 1990 [GB] United Kingdom ............... 9009051

[51] Int. Cl.[5] .................. G01S 13/50; G01S 13/88
[52] U.S. Cl. ................................. 342/90; 342/192
[58] Field of Search .................. 342/93, 192, 196, 90

[56] References Cited

U.S. PATENT DOCUMENTS

| | | | |
|---|---|---|---|
| 4,275,396 | 6/1981 | Jacomini | 342/192 X |
| 4,348,674 | 9/1982 | Muth et al. | 342/192 |
| 4,389,647 | 6/1983 | Fanvele et al. | 342/192 |
| 4,641,138 | 2/1987 | Opitz | 342/192 |

FOREIGN PATENT DOCUMENTS 3002148 10/1981 Fed. Rep. of Germany ...... 342/192

*Primary Examiner*—Gilberto Barrón, Jr.
*Attorney, Agent, or Firm*—Fleit, Jacobson, Cohn, Price, Holman & Stern

[57] ABSTRACT

A pulse doppler radar system for helicopter recognition has a receiver (5) for receiving reflected pulse radar signals. A distinguishing circuit (22) is provided for distinguishing a group of received frequencies within a predetermined spectral range and for ignoring at least the largest amplitude frequency within that group. A threshold detector (24) is arranged to determine when the amplitude of the remaining frequencies in the group exceed a predetermined value to provide a recognition signal.

8 Claims, 1 Drawing Sheet

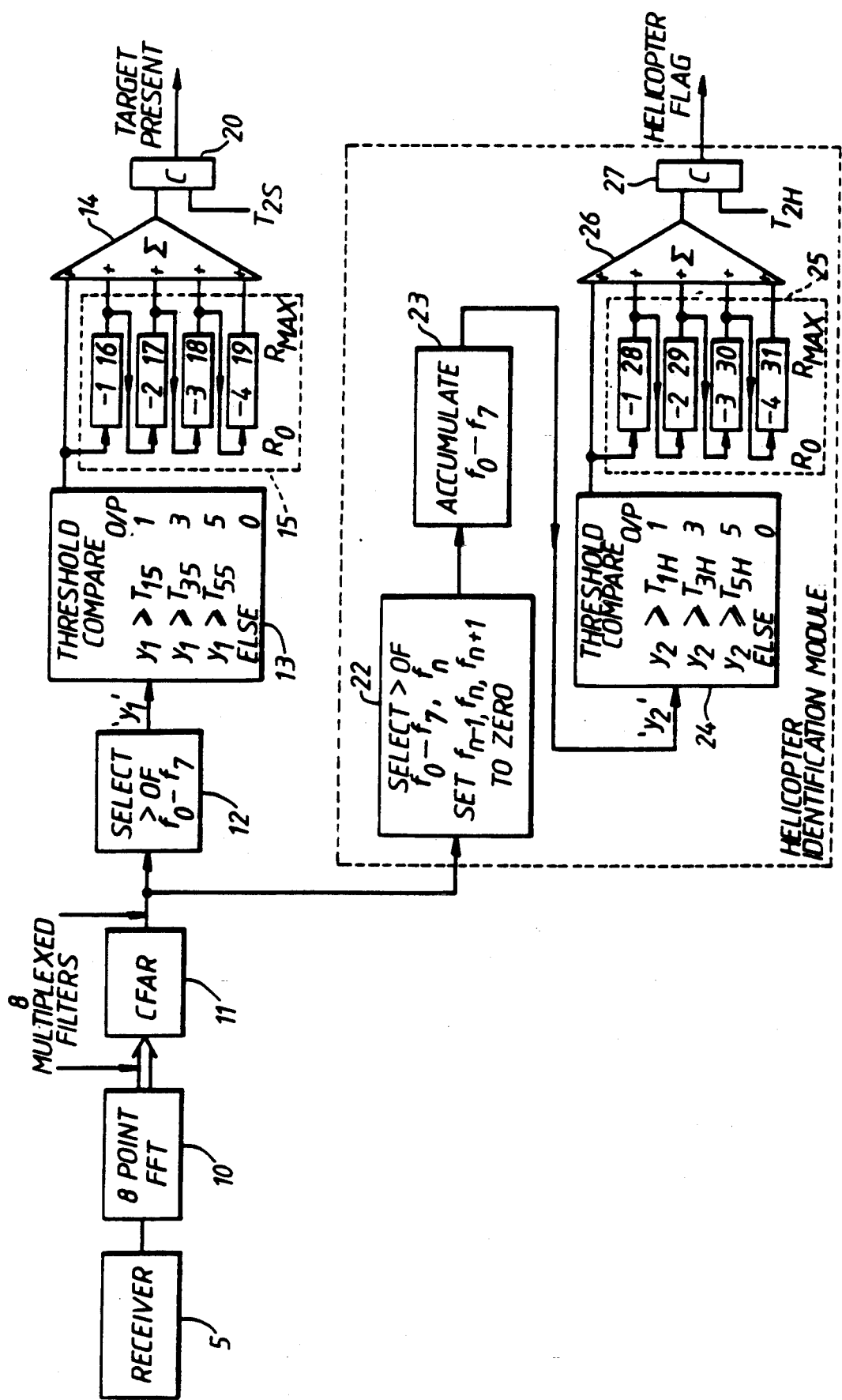

PULSE DOPPLER RADAR SYSTEMS FOR HELICOPTER RECOGNITION

The invention relates to pulse doppler radar systems and more particularly to the recognition of helicopters by such systems.

Conventional pulse doppler radar systems experience difficulty in detecting slow moving objects because they are arranged to filter out reflections from stationary and slow moving objects, generally known as radar clutter. It would be advantageous however to be able to detect helicopters which with current systems are ignored. The present invention is concerned with such detection.

It has been observed that pulses returned by helicopters in doppler radar systems display spectral spreading through a FFT (fast fourier transform) system. The spectral spreading is due to vibration and to rotation of the hub and is not experienced in the reflections from other stationary or slow moving bodies, although all moving bodies will provide a narrow spectral component corresponding to their radial velocity. In an eight point FFT system this corresponds to a response in one filter, indicative of radial movement, sometimes with sidelobes in one or both adjacent filters. Most moving objects have a response in the remaining filters based only on system noise. Helicopters, however, have response in these filters due to the amplitude of the radial velocity component and the spectral spreading.

It was initially thought that if a threshold was set against all filters, e.g. eight in a particular range cell, then a straight "n" out of eight criterion could be set for helicopter identification. As long as the threshold is set above noise, doppler reflections due to normal slow moving objects, would have amplitudes which would cross the threshold only a maximum of three out of eight. It was thought that if "n" was set to four, this should result in helicopter identification whilst minimising false alarms from other bodies. There are a number of basic problems with this method. Firstly, it is possible for other objects to induce some minimal spectral spreading, due for example to vibration. This necessitates a value of "n" greater than four to reduce false alarms. Secondly, with this larger value of "n" the threshold may have to be lowered as the distribution of the helicopter spreading in the remaining filters may not include two above the threshold (this assumes an "n" value of five with the three radial velocity filters obviously greater than the threshold). The result of this is that the thresholds are very difficult to optimise for sensible helicopter identification whilst minimising false alarms.

The previously described method due to its amplitude thresholding throws away a lot of useful information. If the response due to the target radial velocity is removed, the remaining filters will contain information due to spectral spreading only. It is upon this consideration that the present invention is based.

According to the invention there is provided a pulse doppler radar system for helicopter recognition, comprising a receiver for receiving reflected pulse radar signals, means for distinguishing a group of received frequencies within a predetermined spectral range and for ignoring at least the largest amplitude frequency within that group and threshold detection means for determining when the amplitude of the remaining frequencies in the group exceed a predetermined value and for providing a recognition signal.

The invention effectively ignores at least the largest amplitude frequency, as this relates to the radial velocity of the body. This allows the smaller spectral responses to be assessed and compared with a threshold value to enhance the sensitivity and accuracy of helicopter detection.

As previously mentioned some objects other than helicopters, can produce spectrum responses which extend into the two filters immediately adjacent the filter which passes the largest amplitude frequency. Therefore in a refinement of the invention, the means for distinguishing a group of received frequencies within a predetermined spectral range is arranged to ignore the largest amplitude frequency and each immediately adjacent frequency in the group.

In order that the invention and its various other preferred features may be understood more easily, an embodiment thereof will now be described with reference to the drawing which is a simplified schematic block diagram of a pulse doppler radar system incorporating a helicopter recognition system constructed in accordance with the invention.

In the drawing, an input signal from a receiver 5 is coupled via a fast fourier transform circuit (FFT) 10, in this case an eight point FFT is employed. The output of the FFT comprises eight multiplexed filter channels and is fed to a set of cell-averaging circuits 11 which implement the CFAR function. The output of the cell averaging circuits 11 is routed to a target detection system comprising a maximum amplitude signal detector 12, a threshold comparator 13 coupled with the output $y_1$ of the signal detector, which compares the signal $y_1$ with a number of differently weighted threshold values, for example 3 T15, T35, T55, a summing circuit 14, a progressive storage circuit 15 and second threshold comparator 20. The output of the threshold comparator 13 which is a weighted value of 0, 1, 3 or 5 is fed to one input of the summing circuit 14 and also to the first stage of the progressive storage circuit 15 which has a series of memory banks 16 to 19 through which successive sample weighted values from the threshold comparator are sequentially advanced. The value stored in each memory bank is also coupled with an input of the summing circuit which provides an output which is fed to one input of the second comparator 20. The second comparator compares the aggregated signal from the summing circuit 14 with a threshold value T25 and when it exceeds that threshold it provides an output indicative of the presence of a target.

The helicopter recognition system is shown at 21 and comprises a signal amplitude detector and discriminator 22 an accumulator 23, a threshold comparator 24, a progressive storage circuit 25 which has a series of memory banks 28 to 31, a summing circuit 26 and a second threshold comparator 27.

The signal amplitude detector and discriminator 22 determines the largest amplitude received frequency and sets the weighted amplitude value of this and the immediately adjacent frequencies to zero thereby effectively ignoring these responses and providing outputs relating only to the remaining frequencies, in this embodiment five frequencies. These five amplitudes in themselves are each indicative of the presence of a helicopter. However, to provide increased certainty of detection, and avoidance of false detection, the amplitudes are fed to the accumulator 23 and the accumulated value is fed to the threshold comparator 24 where it is compared with a series of weighted values. In the described embodiment three weighted values are employed.

The output of the threshold comparator 24, which is a weighted value of 0, 1, 3 or 5, is fed to one input of the summing circuit 26 and also to the first stage 28 of the progressive storage circuit 25, successive sample weighted values from the threshold comparator are sequentially advanced through the memory bank stages 28 to 31. The value stored in each memory bank is also coupled with an input of the summing circuit 26, which provides an output which is fed to one input of the second comparator 27. The second comparator compares the aggregated signal from the summing circuit 26 with a threshold value $T_{2H}$ and when it exceeds that threshold value it provides an output indicative of the presence of a helicopter.

By employing the remaining five filter signals and accumulating their amplitudes, the large spectral spreads, due to helicopters, are easily distinguished from the minimal amount seen on some doppler targets. To achieve this, the accumulated value is compared to a set of thresholds weighted 1, 3 and 5. If the accumulated value is less than all thresholds, it is assigned a weight of zero, a miss. If it is greater than 1.1 assign a weight of 1, if greater than 1.3 a weight of 3, if greater than 1.5 a weight of 5. For a particular range cell, the current weight plus the weights from four previous processing intervals (corresponding to an antenna beamwidth) are summed. This is a standard multi-level moving window integrator function. The sum (generated over a beamwidth) is now compared to a second threshold to determine if a helicopter is present of not. Trial results have shown that the weighted first threshold and second threshold can be chosen to maintain very good target identification of a helicopter, whilst minimising false identification of "normal" doppler targets, even when they exhibit a certain amount of spectral spreading.

Although the embodiment described employs an eight point fast fourier transform system, it will be appreciated that the invention is not restricted to eight point systems. Other systems e.g. sixteen point fast fourier transform systems can be employed.

Although the described embodiment effectively ignores the maximum amplitude signal and immediately adjacent frequencies to cover side lobes, it is envisaged that in certain circumstances an operational system may be achieved ignoring only the maximum amplitude signal.

Instead of employing the CFAR function, the block 11 could otherwise be implemented as parallel channels up to the selection function 12.

We claim:

1. A pulse doppler radar system for helicopter recognition, comprising a receiver for receiving reflected pulse radar signals, means for distinguishing a group of received frequencies within a predetermined spectral range and for ignoring at least the largest amplitude frequency within that group, threshold detection means for determining when the amplitude of the remaining frequencies in the group exceed a predetermined value and for providing a recognition signal and an accumulator for combining the signals of said remaining signals to provide an aggregate amplitude for evaluation by the threshold detection means wherein the threshold detection means has a series of weighted threshold values indicative of different levels of certainty of helicopter recognition.

2. A system as claimed in claim 1, wherein the means for distinguishing a group of received frequencies within a predetermined spectral range is arranged to ignore the largest amplitude frequency and each immediately adjacent frequency in the group.

3. A system as claimed in claim 1, wherein the means for distinguishing a group of received frequencies within a predetermined spectral range comprises a fast fourier transform circuit.

4. A system as claimed in claim 3, wherein the fast fourier transform circuit provides eight multiplexed filter channels.

5. A system as claimed in claim 3, wherein the output of the fast fourier transform circuit is fed to a set of cell-averaging circuits which implement a CFAR function.

6. A system as claimed in claim 1, comprising a progressive storage means coupled with the weighted output of the threshold detector means and having a plurality of memory banks each for storing a value representative of the weighting of one of a number of successive processing intervals and summing means coupled with the weighted output of the threshold detection means and with each of the memory banks for providing and output representative of the aggregate weighting of successive processing intervals.

7. A system as claimed in claim 6, wherein the storage means has four memory banks.

8. A system as claimed in claim 6 comprising a second threshold detector means coupled with the output of the summing means having an output for providing a helicopter recognition indicating signal when the threshold is exceeded.

* * * * *